May 20, 1930.  L. MAMBOURG  1,759,236
SHEET GLASS APPARATUS
Filed Nov. 17, 1926
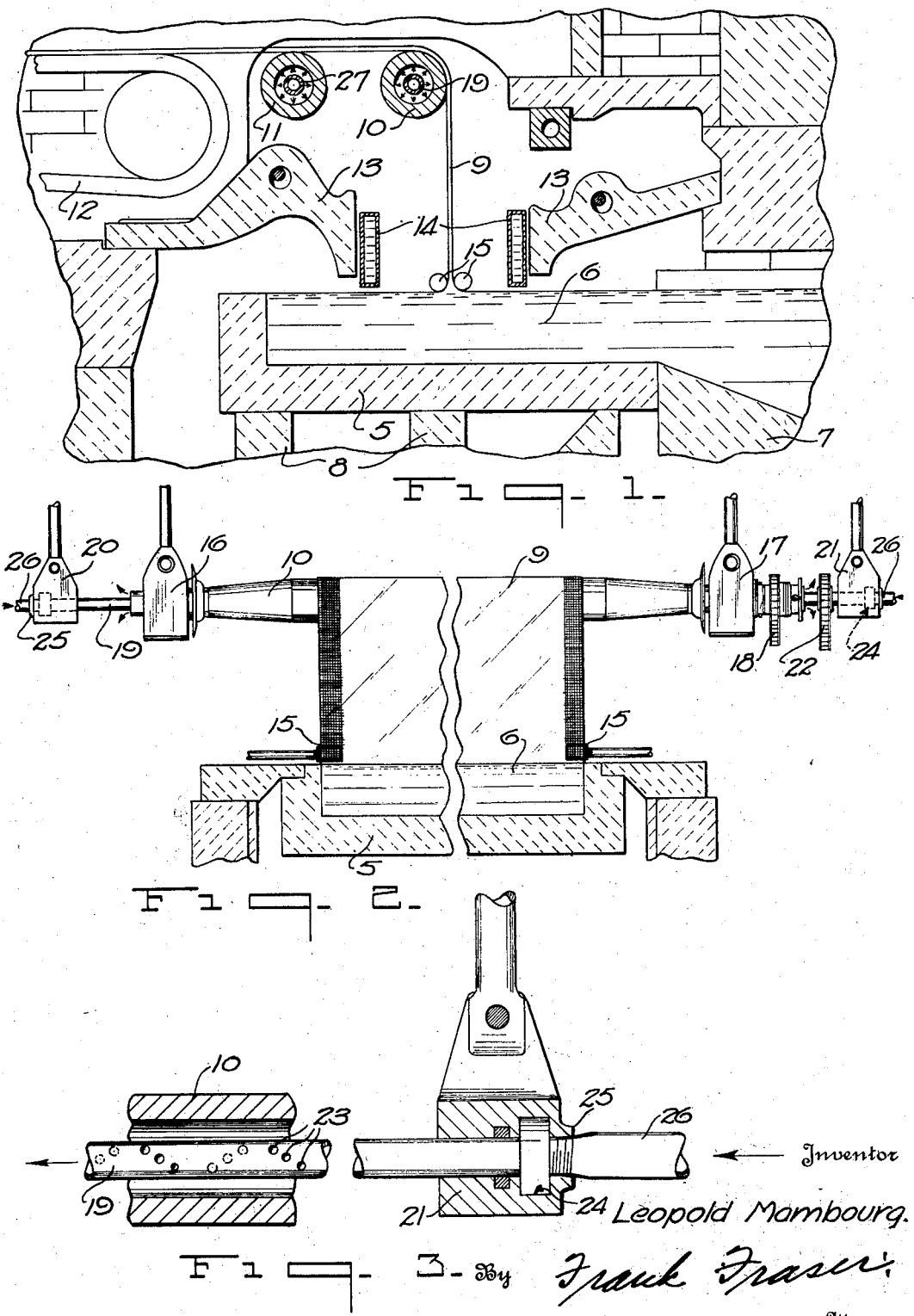

Patented May 20, 1930

1,759,236

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

SHEET-GLASS APPARATUS

Application filed November 17, 1926. Serial No. 148,781.

This invention relates to sheet glass apparatus, and more particularly to the production of a continuous sheet.

In certain systems for producing sheet glass, a continuous sheet is drawn upwardly from a mass of molten glass, and then while still in a semi-plastic condition, although substantially set in its final sheet form, is bent into a horizontal plane over a rotatable bending member, and carried off by means of a suitable drawing mechanism and into an annealing leer. This bending member is usually in the form of a hollow cylindrical body or roll, and in order to prevent the sheet from adhering thereto as it passes thereover, some means must be provided for cooling the same. Heretofore, this has been accomplished by arranging within the bending member a so-called cooler pipe which is provided with a plurality of feed openings. A suitable cooling medium, preferably air, is then forced into the cooler pipe and passes therefrom through the said feed openings into the bending member whereby to cool the same. However, while the bending member is adapted to rotate, it has been customary to so mount the cooler pipe that it will remain stationary, with the result that there has been some tendency for the said cooler pipe to sag, and this sagging has led to an ununiform cooling of the surface of the bending member. It is therefore, an aim of the present invention to overcome the above disadvantages of prior art structures by so mounting the cooler pipe as to prevent any sagging thereof.

An important object of the invention is to provide, in sheet glass apparatus, a bending member for deflecting a sheet from one plane to another, and means rotatably arranged within said member for cooling the same.

Another object of the invention is to provide, in sheet glass apparatus, a rotatable bending member for deflecting a sheet from one plane to another, a cooling member arranged within said bending member, and means for rotating the said cooling member.

A further object of the invention is to provide, in sheet glass apparatus, a cylindrical bending member for deflecting a sheet from one plane to another, a cooling member rotatably arranged within said bending member, and means for forcing a cooling medium through said bending and cooling members.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section of a portion of sheet glass drawing apparatus showing my invention in use, Fig. 2 is a fragmentary transverse section thereof, and Fig. 3 is a longitudinal section through the bending member showing the cooling member in elevation.

In the drawings, the numeral 5 designates a receptacle or draw pot which may be formed from a suitable refractory material and which is continuously replenished with a source of molten glass 6 from any form of tank 7. The pot 5 is supported upon stools 8, and is also heated from beneath by burners which are not shown. A sheet of glass 9 is drawn upwardly from the source of molten glass 6, and at a substantial distance therefrom is deflected into a horizontal plane over a bending member 10, after which the sheet is passed over an idler roll 11, through a suitable drawing mechanism 12, and into an annealing leer where it is gradually reduced to room temperature as is well known in the art.

Arranged above the pot 5 are cover or lip tiles 13 which tend to force any heat currents present at that position downwardly toward the surface of the molten glass 6. Cooling members 14 are arranged at opposite sides of the sheet 9 and closely adjacent the surface of the molten glass to protect the said sheet and to also absorb sufficient heat from the glass passing thereunder to permit the drawing of a good sheet of glass. To maintain the sheet to width, knurled rollers 15, or similar means, are arranged at opposite sides of the sheet at both edges thereof.

As shown in Fig. 2, the bending member or roll 10 is supported at its opposite ends within bearings 16 and 17, and is adapted to be rotated by means of a sprocket and chain connection 18. Extending longitudinally within the bending member 10 and arranged axially thereof is a cooling member or pipe 19, and in accordance with the present invention, this cooling pipe extends beyond the bending member 10 at the opposite ends thereof and is rotatably supported within bearings 20 and 21. The cooler pipe 19 is adapted to be rotated by a chain and sprocket connection 22 and, as shown in Fig. 3, the said pipe is provided with a plurality of feed openings 23, so that the cooling medium may pass therefrom into the bending member 10 as will be more clearly hereinafter described.

As will be noted in Fig. 3, the opposite ends of the cooler pipe 19 do not extend entirely through the bearings 20 and 21, but terminate short of the outer ends thereof and communicate with substantially enlarged openings 24. The bearings 20 and 21 are provided with bosses 25 and in order to force a suitable cooling medium, such as relatively cool air, through the said cooler pipe 19 and bending member 10, there are threaded within the said bosses 25 supply pipes 26.

In the operation of the invention, the bending member 10 and cooler pipe 19 may be rotated either in the same direction or in opposite directions relative to one another as desired. The air, or any other preferred cooling medium which may be used, is forced through the supply pipes 26 into the cooler pipe 19 and passes therefrom through the feed openings 23 into the cooling member 10. This cooling of the said member 10 will prevent the sheet from adhering thereto as it is being deflected thereover and the cooling medium passes outwardly of the said bending member through the opposite open ends thereof, as indicated by the small arrows in Fig. 2. It is believed that by rotatably mounting the cooler pipe 19 in the manner above described, any tendency thereof to sag will be obviated and that a more uniform cooling of the surface of the bending member 10 will be obtained.

As shown, the openings 23 in the pipe 19 are arranged in spiral formation with the result that the rotation of said pipe together with the spiral arrangement of said openings causes a constant shifting of the application of the cooling medium thereby giving uniform heat absorption. If the pipe 19 remained stationary, there would be a tendency toward "spot" cooling which would result in ununiform heat absorption.

As shown in Fig. 1, the idler roll 11 may also be cooled by means of a cooler pipe 27 extending therethrough and which cooler pipe is adapted to be constructed and mounted in the same manner as the cooler pipe 19 arranged within the bending member 10.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for deflecting a sheet from one plane to another, and means rotating within the first named means and independently thereof for cooling the same.

2. In sheet glass apparatus, means for deflecting a sheet from one plane to another, means rotating within the first named means and independently thereof, and means for forcing a cooling medium through said first and second named means and in contact therewith.

3. In sheet glass apparatus, a cylindrical body for deflecting a sheet from one plane to another, and means rotating within said body and independently thereof for circulating a cooling medium therethrough and in contact therewith.

4. In sheet glass apparatus, a cylindrical body for deflecting a sheet from one plane to another, and a member rotating within said body and independently thereof for cooling the same.

5. In sheet glass apparatus, a cylindrical body for deflecting a sheet from one plane to another, and a second cylindrical body rotating within said first named body and independently thereof for circulating a cooling medium therethrough.

6. In sheet glass apparatus, a member for deflecting a sheet from one plane to another, means for rotating said member, a second member arranged within said first named member for cooling the same, and means independently of the first-mentioned rotating means for rotating said second named member.

7. In sheet glass apparatus, means for drawing a sheet from a mass of molten glass, a member for deflecting said sheet from one plane to another, and rotatable means arranged within said member for cooling the same, said rotatable means being rotated independently of the deflecting member.

8. In sheet glass apparatus, means for drawing a sheet from a mass of molten glass, a member for deflecting said sheet from one plane to another, a second member rotatably arranged within said first named member, said rotatable means being rotated independently of the deflecting member, and means for forcing a cooling medium through said members.

9. In sheet glass apparatus, means for drawing a sheet from a mass of molten glass, a rotatable cylindrical member for deflecting said sheet from one plane to another, and a second cylindrical member rotatably arranged within said first named member for cooling the same, said second cylindrical member being independently rotatable with regard to the first rotatable cylindrical member.

10. In sheet glass apparatus, means for drawing a sheet from a mass of molten glass, a cylindrical member for deflecting said sheet from one plane to another, means for rotating said member, a second cylindrical member arranged within the first named member, means for rotating said second named member independently of the first-named member, and means for forcing a cooling medium through said first and second named members and in contact therewith.

11. In sheet glass apparatus, a supporting surface for deflecting a sheet from one plane to another, means for controlling the temperature of said supporting surface, and means for constantly shifting said temperature controlling means relative to said supporting surface.

12. In sheet glass apparatus, means for deflecting a sheet of glass on a constantly shifting supporting surface, means for controlling the temperature of said supporting surface and means for constantly shifting said temperature controlling means relative to said supporting surface.

13. In sheet glass apparatus, a hollow cylindrical member with which said sheet is adapted to contact, and means rotating within said member and independently thereof for cooling the same.

14. In sheet glass apparatus, a hollow cylindrical member with which said sheet is adapted to contact, a second member rotating within the first member and independently thereof, and means for forcing a cooling medium through said first and second named members and in contact therewith.

15. In sheet glass apparatus, a hollow cylindrical member rotatably supported at its opposite ends and with which the sheet is adapted to contact, a second member rotatably arranged within and spaced from the first member and independently thereof, said inner member being provided with a series of spirally arranged openings, and means for forcing a cooling medium through the inner member, said cooling medium being adapted to pass through the openings in said member into the first member and outwardly from the opposite ends thereof.

Signed at Lancaster, in the county of Fairfield and State of Ohio, this 12th day of November, 1926.

LEOPOLD MAMBOURG.